United States Patent Office 2,797,338
Patented June 25, 1957

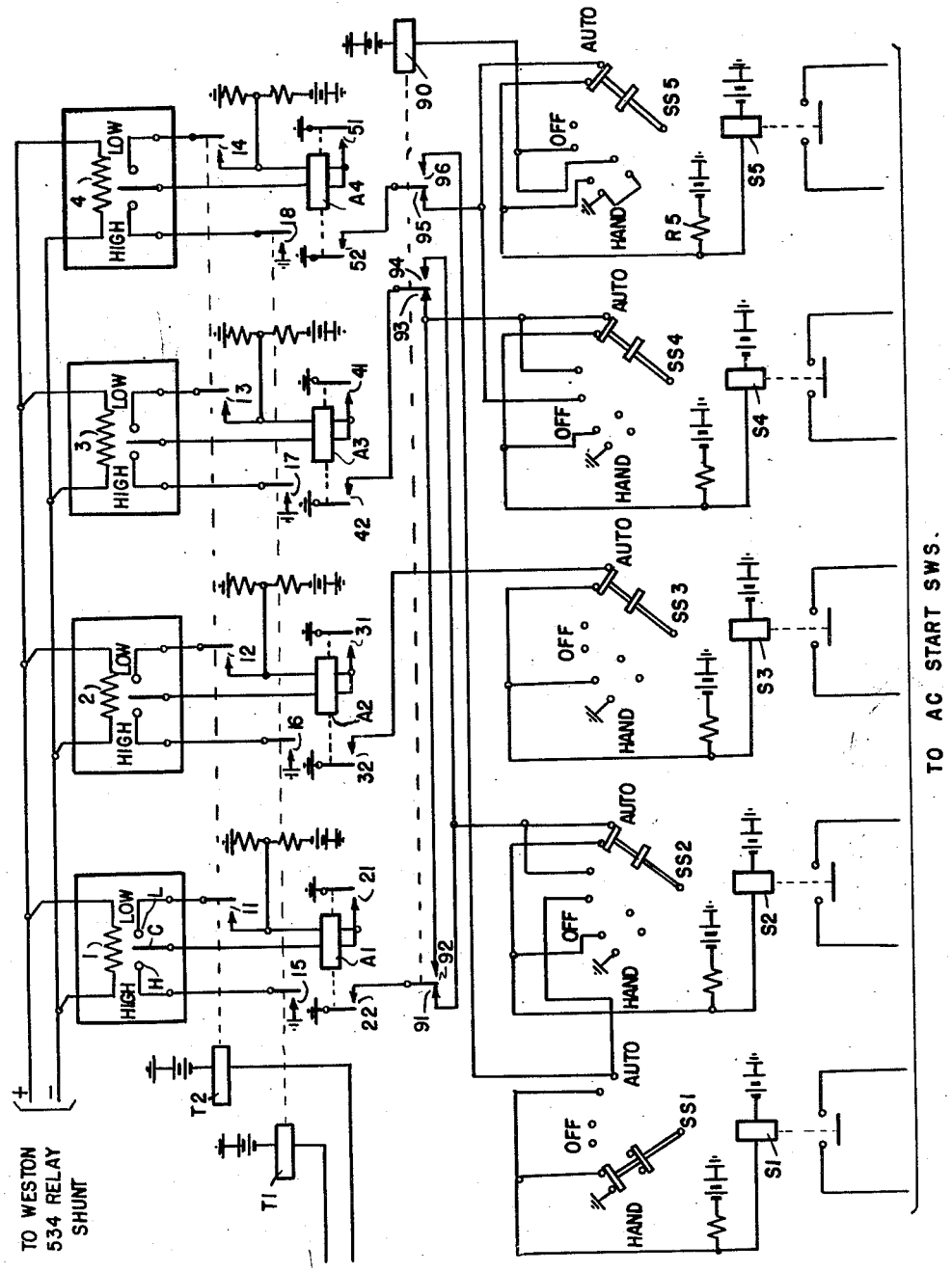

2,797,338

CIRCUIT FOR PREVENTING CONTACT ARCING

Douglas W. Muir, Wheaton, Ill., assignor to General Telephone Laboratories, Incorporated, a corporation of Delaware Application October 28, 1954, Serial No. 465,353

9 Claims. (Cl. 307—84)

The present invention is described in relation to a generator control system for battery charging whereby a plurality of generators are energized in a predetermined order as the battery load increases and are deenergized in another order as the battery load decreases, and relates in particular to an arrangement for eliminating electrical arcing and burning which might otherwise occur across contacts of the type closed through galvanometer action by a current-responsive winding associated with the battery load circuit. This enables the use of high power over a circuit including such contacts for operating a control relay utilized to energize or deenergize a generator associated therewith.

Battery charging generator systems present numerous complications as typified in a telephone exchange, wherein the load on the battery may vary continuously, necessitating the use of a number of generators, dependent on the battery load values, for charging the battery. The starting and stopping torque of each generator constitutes a severe strain on the generator, and if it were deenergized at the same point it was energized, it would be started and stopped at undesirably frequent intervals, as the battery load fluctuated about the starting value. To avoid the problem of frequent starts and stops each generator is deenergized only when the load current reaches an individually corresponding value considerably below the starting value. Thus the current relays associated with the load circuit and used for determining when the generator should be energized or deenergized, must each control a starting circuit and a stopping circuit, necessitating the use of at least two contacts per current relay.

Usually a number of Weston galvanometer type relays such as Weston model 534 are used for controlling a generator individual thereto. The relays are connected in shunt with a Weston type 534 relay shunt in the battery load circuit. Each Weston relay initially has its galvanometer needle in a position corresponding to the value of load current at which its individual generator is deenergized, but as the battery load current increases, each takes a position dependent on its adjustment between the deenergizing position and the energizing position. Each is arranged so that load current values individual thereto will result in bringing its needle into an energizing position or a deenergizing position, where a circuit is completed by the needle and a contact in each position for effectuating a control relay individual thereto. The control relay in turn initiates operation of the individual generator, when the needle reaches an energizing position, or terminates operation of its individual generator respectively, when the needle reaches the deenergizing position. Due to the nature of the galvanometer needle movement, it is difficult to insure the needle will make a good or comparatively high pressure contact, except when the needle is pressed tightly against one of the associated contacts, and even then only a very nominal pressure holds the contacts together. Thus the contacts are constructed and aligned with extreme accuracy and any arcing or burning which occurs across the contacts reduces the efficiency with which the contacts are capable of completing a circuit, which in turn induces more arcing as the pitting, which results from arcing or burning, causes the contact resistance to current flow to increase. Low power therefore has been used in the circuits completed by the galvanometer needle to reduce arcing or burning of the contacts, which would normally occur more often when high power is utilized in conjunction with contacts having light pressure. This in turn has created difficulty in securing proper operation of the control relay and its use has been limited to controlling a follower relay only, which in turn secures the objectives of the system. Another problem is that the control relay may fail to operate, when a high resistance circuit is completed because the galvanometer contacts are under light pressure or have pitted due to burning or arcing having occurred across them, thereby subjecting the contacts to more burning as long as the high resistance circuit is completed.

It is, therefore, among the objects of this invention to eliminate arcing across the contacts to thereby insure the longer life of the contacts; insure that no high resistance circuit is completed for any undue length of time while the control relay remains unoperated and burning of the contacts occurs, and to provide sufficient power to the control relay without the danger of creating an arcing condition across the contacts so that the control relay will operate under a wider range of conditions and have sufficient power to perform all necessary functions to accomplish the objectives of the system and thereby eliminate the need for a follower relay and resulting in a more simplified and inexpensive system.

The drawing comprises one figure illustrating the manner in which the circuits are arranged for accomplishing the objectives of the invention.

Four Weston galvanometer type current relays 1–4 are shown. All are connected in shunt with a Weston type 534 relay shunt (not shown) in the load circuit of the battery over the + and − leads. Relay 1 may be adjusted so that when the battery load circuit is drawing 5 amperes of current its needle C is in the low position, where it makes contact with L, and when drawing 15 amperes of current the needle C is in the high position, where it makes contact with H. For values in between 5 and 15 amperes, needle C stands at a corresponding position between its low and high positions. Similarly, relay 2 brings its needle from its low position, when the battery load circuit is drawing 10 amperes of current to its high position at 20 amperes of current; relay 3 at 15 amperes and 25 amperes respectively and relay 4 at 20 amperes and 30 amperes respectively. Each needle is connected through two windings in series of a control relay individual thereto to a potentiometer, which produces about 6 volts at the point where it is connected to the relay. Each control relay A1–A4 controls an individually associated start relay, which in turn controls an A. C. start switch for controlling a generator individual thereto. The right winding of each control relay is arranged to exert about twice the power of its left winding, and once the associated contacts have been operated, it has sufficient power to maintain them operated. The contacts are operated, when both windings are energized in series. One contact completes a circuit for energizing the associated start relay to initiate operation of the associated generator. Thereafter the left winding is shunted by another contact to prevent surge currents from affecting the galvanometer contacts on collapse of the field through the left winding. When the left winding is energized in opposition to the right winding, the field of the relay is reduced sufficiently to restore its contacts thereby deenergizing the start relay and generator. When the windings are energized in opposition, the circuits are completed through an already operated common contact such as 21, and this contact is one of those restored. As this contact opens, any surge currents created, surge across it instead of the galvanometer contacts. Also the collapse of the fields created by the windings occurs in opposition to each other to aid in eliminating surge currents across the galvanometer contacts. In any event the circuits completed through the galvanometer contacts are thereby rendered safe from surge currents. The control relays A1–A4 exercise control over the start relays S2–S5 through a three-position switch individual to each start relay whose function will be explained shortly.

In addition relays T1 and T2 are provided to prepare circuits for the control relays when the galvanometer needles are in the high position and low position respectively. Relays T1 and T2 are operated alternately and each for only one fourth of a second in any well-known manner by an intermittent ground applied to their respective windings. Thus if a high resistance circuit is completed by a galvanometer needle to its associated control relay wherein the control relay does not operate, the circuit will be held closed for only a short period of time and therefore the contacts are protected from burning.

In the present arrangement four galvanometer relays and five generators are used. A start relay is associated with each generator, and with each start relay is associated a three point switch, which is manually controlled. The manually controlled switches SS1–SS5, each have four contacts, two of which are closed in the hand position, one in the auto and one in off position. Switches SS1–SS4 have one pair of contacts in the hand position disconnected and the other pair of contacts are arranged to complete the circuit of their associated start relays. Switches SS1 and SS3 also have their off positions disconnected. The use of these switches will now be more fully explored. The switch SS1 associated with start relay S1 is shown as manually operated to the hand position. A circuit is completed from ground at the upper contacts of switch SS1 in its hand position to start relay S1 so that the generator associated therewith is operated. With switches SS2, SS3, SS4 and SS5 in the auto position as shown in the drawing, control relays A1, A2, A3 and A4 respectively control start relays S2, S3, S4 and S5 respectively. Any start relay may be continuously energized to energize its associated generator continuously by throwing the associated switch to its hand position, where an obvious circuit similar to that described for start relay S1 is maintained to its associated start relay. Thus two or more generators may be made to operate simultaneously. By throwing any switch to its off position, the associated relay is prevented from operating so that its associated generator cannot be operated. Also the arrangement may be varied through the use of switches SS1–SS5 as will be explained so that the sequences in which the generators are controlled may be changed.

With switch SS1 associated with start relay S1 and the first generator in the hand position the first generator is operated as previously explained, when start relay S1 closes the A. C. start switch associated therewith. Ground is intermittently applied, as previously explained to energize relays T1 and T2 alternately. Relay T2 closes contacts 11, 12, 13 and 14 to prepare a circuit from ground through the low side such as L of each galvanometer relay. When the needle C is wavering about L and contacting it during such periods as the battery load is about 5 amperes, no circuit is completed to the windings of relay A1 and no arcing takes place across C and L. When the exchange equipment is drawing 10 amperes of current, needle C is rotated to a position where it is standing out of engagement with both the low and the high sides L and H respectively. Consequently no circuits are then completed. As the battery load increases to about 15 amperes, needle C moves into engagement with the high side H. The needle C as it rotates toward H may initially form a low pressure contact with H thereby creating a high resistance circuit, but as the load increases needle C is brought more tightly against H to raise the contact pressure and improve the circuit. No circuit can be completed through relay A1 except when relay T1 has operated to close contacts 15 to ground and a good contact has been made between C and H. This prevents small values of current, which pass during periods of light pressure between C and H and which are insufficient to operate relay A1, from affecting the contacts, as relay T1 opens after one fourth of a second to open the circuit. Relay T1 also closes contacts 16, 17 and 18, however the needle contacts associated therewith are at such times either out of engagement with their respective high sides or still in engagement with their low sides as needle C is the first to come into contact with its high side H. Needle C on making contact with the high side H, while contacts 15 are closed, completes an obvious circuit through both windings of relay A1 in series to the 6 volt connection at the potentiometer. Relay A1 operates, if needle C is in fairly firm contact with H, to close contacts 21 and 22. The back E. M. F. now generated in both windings tends to oppose a rapid build up of current and no arcing takes place across needle C and contact H. Contacts 21 on closing shunt the left winding, while providing a direct ground for holding the right winding energized. As the left winding is shunted, the field created thereby collapses but the short circuit to ground at contacts 21 prevents currents created at that time from affecting the galvanometer contacts. The circuit through the left winding will thereafter be opened by relay T1 or may be opened by the needle C moving from H, however no effect will be had as the field created by the left winding is already collapsed. Later closing of the circuit through the left winding as a result of needle fluctuations about H has no effect on relay A1 or the galvanometer contacts as the circuit through the left winding of relay A1 is shunted at contacts 21. At contacts 22 a circuit is completed through contacts 91, the contacts of switch SS2 in its auto position and through the winding of start relay S2 to battery. Start relay S2 operates to close its associated contacts to thereby initiate operation of the second generator.

With the current in the exchange circuit building up to a value of around 20 amperes a process similar to that described for operating relay A1 takes place at relay 2 for operating relay A2. The only difference being in the value of the load current necessary to bring about the operation of relay A2. Relay A2 operates and completes a holding circuit for its right winding at contacts 31. At contacts 32 relay A2 energizes the winding of start relay S3 through the contacts of switch SS3 in its auto position. Relay A3 is operated in a manner similar to that described as to relays A1 and A2, and it completes a holding circuit for its right winding at contacts 41 and at contacts 42 completes a circuit to its associated start relay S4 through contacts 93 and the contacts of its associated switch SS4 in its auto position. Relay A4 on operating completes a holding circuit to its right winding at contacts 51 and at contacts 52 completes a circuit to its associated start relay S5 through contacts 95 and the contacts of its associated switch SS5 in its auto position.

When the load current begins to fall, the needle of relay 4 is the first to come in contact with its low side, and when contacts 14 are closed during the time relay T2 is operated, the left winding of relay A4 is obviously energized in an opposite direction to its right winding. Here also, if a light pressure contact, which results in a high resistance circuit, is made, relay T2 opens the circuit after one-fourth of a second to prevent the contacts from burning. The energized left winding of relay A4 in opposition to the already energized right winding, causes contacts 51 and 52 to open and deenergize relay A4 and the start relay S5 respectively. When contacts 51 open, the field created by both windings starts to collapse, but any surge currents created must arc across contacts 51. Thus the galvanometer contacts are protected from having any surge currents arcing across them. Further such surge currents are greatly reduced or eliminated by the opposition of the two fields. Start relay S5 on deenergizing opens the A. C. start switch associated therewith to terminate operation of the fifth generator. Resistor R5 and battery connected thereto provide a shunt circuit for any surge currents created on collapse of the field through relay S5 to prevent any arcing across contacts 52, when they open. A similar arrangement is provided for each other start relay. As each other galvanometer needle comes in contact with its low point, the associated control relays A1—A3, respectively, are deenergized in a manner similar to A4 to deenergize the corresponding start relays and generators. Due to the sequence in which relays 1, 2, 3 and 4 bring their respective needles to their respective low points the generators are deenergized in a reverse order to that in which they were originally energized.

To change the sequence in which the generators are operated, switch SS5 is thrown to its hand position to open the auto position contacts of SS5 and terminate the control by relay A4 of start relay S5. Relay 90 is energized from ground through the lower contacts of switch SS5 in its hand position, and it transfers the control exercized by relays A1, A3 and A4 over start relays S2, S4 and S5, respectively, through contacts 91, 93 and 95, respectively, so that relays A1 and A3 control start relays S4 and S2, respectively, and the associated respective generators. By throwing switch SS1 to its auto position, relay A4 is enabled to control start relay S1 and the generator associated therewith over contacts 52 and 96 and the contacts of switch SS1 in its auto position. With switch SS5 in the hand position, start relay S5 is operated continuously over an obvious circuit to maintain the generator associated therewith continuously operated. Thus the generators may be energized and deenergized in an order opposite to that originally described. By throwing switch SS2 to its off position, while relay 90 is operated, the energization of start relay S2 is prevented. With switch SS1 in the auto position, relay S1 will now be under control of relay A3 as it responds to high values of current before relay A4 and to low values of current after relay A4. Likewise with switch SS5 in the auto position and switch SS4 in the off position, relay A3 instead of relay A4 will control start relay S5 over an obvious circuit and for the reasons just explained. Thus flexibility in supervising and controlling the generators in response to the condition of various current relays is attained.

It will be obvious to those skilled in the art that modifications may be made in details of construction and arrangement without departing from the inventive concept as set forth in the appended claims.

What is claimed is:

1. For use with a current responsive device having a movable contact which is moved by said device in accordance with the current applied to said device to move said contact into engagement with another contact to close one circuit in one position and to close another circuit in another position by moving said movable contact into engagement with a last contact, a double wound relay, said circuit closed in said one position effective for energizing both windings of said relay in series to thereby operate said relay, and means operated by said relay for deenergizing one winding of said relay while preventing surge currents from occurring across said engaged contacts in said one position during said deenergization and at such times as said contact is thereafter moved from and to said one position and also effective for holding the other winding of said relay energized, said one winding energized in opposition to said other winding by said other closed circuit when said movable contact is moved into engagement with said last contact in said other position to thereby operate said means for deenergizing both said windings, said means when operated by said windings energized in opposition effective in conjunction with said windings deenergized in opposition for preventing surge currents from occurring across said engaged contacts in said other position.

2. In an arrangement of such as claimed in claim 1, means for preparing said one circuit intermittently for predetermined periods of time to prevent current across said contacts at said one position from burning said contacts in the event said windings are not energized.

3. In an arrangement such as claimed in claim 1, means for preparing said other circuit intermittently for predetermined periods of time to prevent current across said contacts at said other position from burning said contacts in the event said one winding is not energized.

4. An arrangement for preventing electrical arcing across contacts when an inductive circuit including said contacts is opened, comprising a double wound relay, a circuit normally completed through one winding for energizing said one winding, means conditioned by said energized one winding for maintaining said circuit completed, and a second circuit completed through said contacts and the other winding and part of said first circuit for energizing said other winding, the field created by said energized other winding opposing the field created by said one winding so as to operate said conditioned means to open said first circuit and said second circuit to thereby deenergize both said windings and also prevent an electrical arc from occurring across said contacts regardless of the pressure therebetween.

5. An arrangement for preventing electrical arcing across contact springs when an inductive circuit including said springs is rendered ineffective, comprising a double wound relay, means for energizing both windings of said relay in series when said contact springs are closed, and means operated on energization of both said windings for deenergizing one winding, preventing surge currents from occurring across said springs and maintaining the other winding energized for maintaining itself operated.

6. An arrangement for preventing electrical arcing across contacts when an inductive circuit including said contacts is rendered ineffective, the improvement comprising a double wound relay, means for energizing both windings of said relay in series when said contacts are closed, other means operated on energization of both said windings for deenergizing one winding, preventing surge currents from occurring across said contacts and maintaining the other winding energized for maintaining itself operated, another circuit, another contact, and means for completing said other circuit through one of said first contacts and said other contact and said one winding for energizing said one winding in opposition to said other winding, said other means operated thereby to deenergize both windings whereby both said windings are deenergized in opposition to aid in preventing surge currents from occurring across said other contact and said one of said first contacts.

7. An arrangement for preventing electrical arcing across contacts when an inductive circuit including said contacts is opened and wherein one contact is adapted to be moved in accordance with a variable force exerted thereon to engage the other contact under a pressure dependent on the force exerted thereon, comprising a relay, a circuit completed through said contacts and the winding of said relay for energizing said winding, and means operated by the field created by said energized winding for opening said circuit to deenergize said winding to thereby prevent an electrical arc from occurring across said contacts regardless of the pressure thereon.

8. For use with a plurality of generators available for charging a battery and having a number of devices individually associated with each generator which are operated in accordance with the load on said battery to close contacts individual to said devices when the load on said battery reaches a first individually corresponding value and to close other contacts when the load on said battery reaches another individually corresponding value, a double wound relay for each of said devices, a circuit completed through both windings in series by the contacts individual to its associated device which are closed when the load on said battery reaches the first value individual to said associated device for energizing said relay windings to initiate operation of the generator associated with its device, means operated by said energized relay windings for preventing the portion of said circuit extending through one winding and said closed contacts from carrying current across said closed contacts and said one winding to deenergize said one winding, said operated means maintaining the other winding energized to thereby maintain said generator operated, and another circuit completed when said other contacts associated with said other energized winding are closed for energizing said one winding in opposition to said other winding to thereby restore said relay and halt said generator, said relay operated means also operated by said windings energized in opposition for deenergizing both said windings and for preventing surge currents from occurring across said closed contacts due to the collapse of the field created by said oppositely energized windings.

9. For use with a plurality of generators available for charging a battery and having a number of devices individually associated with each generator which are operated in accordance with the load on said battery to move an individually corresponding contact into one position for effectuating one circuit when the load on said battery reaches a first individually corresponding value and to move said contact into another position for effectuating another circuit when the load on said battery reaches another individually corresponding value and means whereby said contact is protected from destructive surge currents comprising a double wound relay for each of said devices, said first circuit effectuated for energizing both windings in series when the load on said battery reaches the first value individual to its associated device to thereby initiate operation of the generator associated with its device, a last circuit, and means operated by said energized windings for completing said last circuit, said last circuit maintaining one winding energized for maintaining said generator operated and maintaining said means operated for deenergizing the other winding and for preventing surge currents from affecting said contact in said one position, said other circuit effectuated when said contact is in said other position for energizing said other winding in opposition to said one winding to thereby halt its associated generator, said operated means thereby operated for opening said other and last circuits for deenergizing both said windings and for preventing surge currents from affecting said contact when the field created by said windings collapses.

References Cited in the file of this patent

UNITED STATES PATENTS 1,267,156    Winter               May 21, 1918